United States Patent Office 2,836,576
Patented May 27, 1958

2,836,576

FIBROUS PELLICLE COMPRISING ORIENTED ETHYLENE TEREPHTHALATE POLYMER AND AMORPHOUS ETHYLENE TEREPHTHALATE BINDER AND PROCESS FOR MAKING SAME

John A. Piccard, Swarthmore, Pa., and Frank K. Signaigo, Wilmington, Del., assignors to E. I. du Pont de Nemours & Company, Wilmington, Del., a corporation of Delaware No Drawing. Application December 31, 1954
Serial No. 479,250

4 Claims. (Cl. 260—45.4)

This invention relates to a novel article of commerce and to a process for its preparation. More particularly it is concerned with a fibrous pellicle of a bonded mass of molecularly oriented fiber, produced from a synthetic linear ethylene terephthalate polymer.

It is an object of the present invention to provide a fibrous pellicle of a bonded mass of molecularly oriented fiber produced from a synthetic linear ethylene terephthalate polymer.

Another object is to provide a process for the production of a fibrous pellicle of a bonded mass of molecularly oriented fiber produced from a synthetic linear ethylene terephthalate polymer.

These and other objects will become apparent in the course of the following specification and claims.

In accordance with the present invention a fibrous pellicle of a bonded mass of molecularly oriented fiber produced from a synthetic linear ethylene terephthalate polymer is formed by hot-pressing a mixture of reticulated, molecularly oriented fiber produced from a synthetic linear ethylene terephthalate polymer and a binder therefor of unoriented, amorphous synthetic linear ethylene terephthalate polymer.

The synthetic linear ethylene terephthalate polymer used in the process of this invention may be polyethylene terephthalate, per se, disclosed in Whinfield and Dickson U. S. P. 2,465,319, or a linear copolyester in which ethylene terephthalate is the major and characterizing ingredient. Thus copolymers may be used which contain a second glycol and/or dibasic acid component provided only that the crystallizability requirement given below be met. Among the many glycols that may be used in the preparation of the copolyesters there may be mentioned trimethylene glycol, tetramethylene glycol, hexamethylene glycol, diethylene glycol, propylene glycol, etc. Dibasic acids that may be used in the preparation of suitable copolyesters are sebacic, suberic, azelaic, adipic, oxydivaleric, ethylene bis p-oxybenzoic, and many others. When molten polyethylene terephthalate is chilled rapidly, the solidified polymer is obtained in an "amorphous" condition. On the other hand when polyethylene terephthalate is cooled slowly from the molten condition, or when the solidified amorphous polymer is heated for a few minutes to a temperature between 120° C. and its melting point, examination by X-ray diffraction methods will show that it is crystalline. Thus this material is "crystallizable." The copolymers of ethylene terephthalate with other polymerizable materials in many cases are also crystallizable by the same method. It appears essential that, for such a copolymer to be crystallizable, it should contain at least a preponderance of ethylene terephthalate. The upper limit of the amount of copolymerizable material which may be included without destroying the crystallizability of the copolymer varies somewhat with the particular copolymerizable material employed. When too little ethylene terephthalate, or conversely, too much copolymerizable compound, is present, the copolymer fails to yield a characteristic crystal pattern when examined by X-ray methods, regardless of previous heat treatment. The crystallizable compositions can easily be recognized by the X-ray diffraction method, with previous heat treatment where necessary, and it is the crystallizable polymeric bodies to which the present invention relates.

By the term "fiber" as employed herein is intended a shaped body of filamentous character, either of definite or indefinite length such as staple, flock, continuous filament, spun yarn or the like. By a "fibrous pellicle" is meant a fabric-like or paper-like pellicle, the structural component (as distinct from the binder component) of which comprises a molecularly oriented fiber. A fiber produced from an ethylene terephthalate polymer is "molecularly oriented" when the extruded polymer has been drawn at least about 3 times and preferably about 5 times its extruded length, to produce a structure which is either crystalline or will immediately become crystalline on heating to a temperature over 100° C., the crystallinity being indicated by the production of a crystalline pattern upon X-ray analysis. A fiber is in the "unoriented, amorphous" state when it is produced without drawing and when its X-ray diffraction pattern exhibits substantially no evidence of crystallinity. It has been observed that the unoriented, amorphous form of an ethylene terephthalate polymer is subject to temporary melting at a temperature below the melting point of the crystalline form of the polymer. The temperature at which temporary melting of the unoriented amorphous polymer occurs will be referred to hereinafter as the "temporary melting point," whereas the temperature at which the crystalline form of the unoriented polymer melts will be designated the "true melting point." It has been further noted that the crystalline structure of the molecularly oriented material is not substantially randomized at the temporary melting point. A continued heating of the temporarily melted amorphous material beyond its temporary melting point produces a hard, crystalline form having a true melting point well above the temporary melting point. It has therefore been found possible to adhere a reticulated mass of molecularly oriented fiber produced from a linear ethylene terephthalate polymer by heat-pressing an intermixture of such fibers with a binder, i. e., fiber or finely divided particles such as powder or confetti, of substantially unoriented, amorphous, but crystallizable linear ethylene terephthalate polymer and thereafter hardening the unoriented amorphous element by cooling or by crystallizing it by continued application of heat.

The following examples are cited to illustrate the invention. They are not intended to limit it in any manner.

Example I

A mixture of 0.6 gram of ⅛ inch staple (300 denier per filament) of polyethylene terephthalate, melt spun into unoriented amorphous fibers in accordance with U. S. Patent No. 2,465,319 without drawing and 9 grams of 2½ inch staple (3 denier per filament) molecularly oriented and produced in accordance with U. S. Patent No. 2,604,689, is thoroughly blended and randomly disposed in an 8 x 8 inch square. The fiber mass is then pressed between two cardboards having an uncoated cellophane facing to prevent sticking, under a pressure of 625 pounds per square inch at 150° C. A paper-like pellicle is produced which, when fluffed by hand, has a soft quilted appearance. It weighs 0.13 gram per sq. inch and is nearly impossible to tear bare-handed. A half-hour wash in an automatic agitator washer softens the pellicle and raises a nap without noticeable weakening.

Example II

The technique and equipment of Example I is employed to produce a paper-like pellicle of 5 grams of the oriented fiber of Example I and 0.3 gram of the unoriented amorphous fiber of Example I. A product similar in appearance but of lighter weight than that of Example I results.

Example III

The process of Example II is followed except that the amorphous staple is ½ inch instead of ⅛ inch. No noticeable change in product properties is apparent.

Example IV

The process of Example I is employed to form a sheet from polyethylene terephthalate fiber wherein the unoriented amorphous fiber has a denier of 20 instead of 300. The product possesses no visible quilting points, but is of somewhat lower strength than that of Example I.

Example V

A mixture of 8 grams of the oriented staple fiber of Example I and 1 gram of finely divided confetti particles of amorphous polymer, obtained by cutting a copolyester film composed of 90% by weight of polyethylene terephthalate and 10% of polyethylene sebacate, is randomly disposed in the form of a mat, which is pressed at a temperature of 130° C. in the manner described in Example I. The resulting non-woven pellicle is soft and has a quilted appearance. It is useful as a filter fabric.

In mixing the reticulated, molecularly oriented fiber and binder in accordance with the present invention, it is convenient to form the components into a batt. Such a batt may be formed by carding the mixture of oriented fiber and binder or by garnetting or the oriented fiber may be carded into a batt and then the binder added. Another method of batt formation is by an air-doffing technique, as described in U. S. Patent No. 2,451,915 to Buresh. Paper-making techniques offer a suitable method for constructing the batt by suspending the oriented fiber and binder in aqueous media, mixing the two suspensions, casting the mixture so formed on a foraminous surface and then drying. Instead of laying the batt from liquid suspension, staple, fiber or filament in wet or dry condition may be blown or dropped upon a surface, or a continuous filament may be crossed lapped on a surface. The fiber may be crimped or uncrimped and of circular or irregular cross section. Generally, for a fiber, whether molecularly oriented or amorphous unoriented, it is preferred that it be within the range of from about 1/32 of an inch to 8 inches, although a continuous filament of indeterminate length is suitable. The binder may be added in the form of discrete particles such as granules, chips, flakes, shreds, confetti, or comminuted pieces, the dimensions of which may vary widely. The binder polymer must be both amorphous as well as either substantially or completely unoriented. The bonded pellicle made from the mixture of the structural and binder components becomes more rigid and less porous as the proportion of unoriented amorphous binder is increased. A very small amount of binder is sufficient to provide enough strength in the mixture to make subsequent handling of the pellicle easier. Generally, not more than about 30% by weight of the binder fiber will be employed in the mixture if the properties of a bonded fabric are to be retained. With fine denier fibers or small particles as binder there is no particular limitation of the preferred proportion in the mixture. However, it is preferred to use less than 10% by weight binder when the binder particles are large or of heavy denier, if it is desired to limit the boardy character of the pellicle. Use of binder particles larger than the structural fiber so that they may surround a number of the structural fibers are more effective in adding strength to the pellicle than use of binder particles the same size as the structural fiber.

On a weight basis of unoriented, amorphous polymer, the pellicles produced from fine powdered or fine denier unoriented amorphous polymer are weaker than those produced from the unoriented amorphous polymer in the coarser forms.

The filamentary structures, i. e., both the molecularly oriented and the unoriented amorphous, may be carded prior to the batt formation. They may thereafter be crossed at any angle desirable. A randomly disposed reticulated mass containing each type of fiber is preferred, unless the user wants more strength in one direction, in which case the fibers may be preferentially aligned in that direction, as for instance by using carded webs for the batt formation without cross-lapping them. A batt may be made of several layers of oriented fiber and the binder (fibers or particles) spread or sprinkled between the layers of oriented fiber.

In order to obtain a bond of the batt it is necessary to increase its temperature above the temporary melting point of the unoriented amorphous polymer, but below that temperature at which substantial molecular randomization occurs in the molecularly oriented fiber. The batt may be heated prior to application of pressure, provided that crystallization of the unoriented, amorphous binder is avoided, or while the batt is within the press. Temperatures higher than the melting point of the crystalline polymer may be employed provided the batt is not subjected to the heated zone for a sufficient period of time to raise the temperature of the structural oriented fiber to that point. A temperature of at least about 140° C. is satisfactory with a polyethylene terephthalate binder. The presence in the binder of a plasticizer or a plasticizing component, such as is illustrated in Example V, may lower this temperature by as much as about 10° C. to 20° C. Where the structural oriented fiber has a draw ratio above 3×, a temperature within the range of from about 150° C. to about 180° C. is preferred.

The pressure and temperature may be applied at a heated roll or at a press of conventional design. While some bonding can be obtained with very little pressure, at least about 50 pounds per square inch is useful in preventing an undue number of loose ends. A pressure of about 500 pounds per square inch is preferred. Higher pressure may be employed without deleterious effects.

The properties of the pellicle produced can vary over a wide area, depending upon the density of the fibers in the batt, the proportion of oriented fibers to amorphous fibers, the pressure employed, after-treatments, such as napping and the like. A product having an open structure is often preferred, since it possesses a softer hand. It is particularly useful as a backing for surface coated papers and fabrics. Thus the bonded pellicle may be coated by doctoring onto the surface a coating in suitable form (i. e., a plastisol) of a resin or rubber, such as polyvinyl chloride, a cellulose derivative (e. g., cellulose nitrate, cellulose acetate, ethyl cellulose), a polymer or copolymer of butadiene with styrene or acrylonitrile, polychloroprene, and the like. The coated pellicles are useful for upholstery. Other uses for the pellicle of this invention include filtration fabrics, clothing interlining, medical absorbents, decorative wrapping materials, backing material for coated abrasives, reinforcing agent in plastic laminates, overlay mats over glass reinforced plastic laminates, varnished cambric substitute for making coil windings and other electrical applications by first impregnating the non-woven pellicle with a suitable resin.

Many obvious modifications will be apparent to those skilled in the art from a reading of the above without a departure from the inventive concept.

What is claimed is:

1. A fibrous pellicle comprising a bonded mass of a fiber of a molecularly-oriented ethylene terephthalate polymer and an unoriented ethylene terephthalate polymer binder; the said ethylene terephthalate polymer of both the fiber and binder being a linear polyester containing a preponderance of ethylene terephthalate in the polymer chain.

2. The product of claim 1 wherein the ethylene terephthalate polymer of both the fiber and the binder is polyethylene terephthalate and the unoriented ethylene terephthalate polymer is at least partially crystalline.

3. A process for producing a fibrous pellicle which comprises forming a mixture of a fiber of a molecularly oriented ethylene terephthalate polymer and an unoriented amorphous ethylene terephthalate polymer binder having a melting point in the amorphous state lower than the melting point in the crystalline state, hot-pressing the mixture at a temperature of at least the melting point of the binder in the amorphous state and thereafter resolidifying the binder; the said ethylene terephthalate polymer of both the fiber and binder being a linear polyester containing a preponderance of ethylene terephthalate in the polymer chain.

4. A process for the production of a fibrous pellicle which comprises forming a mixture of a fiber of a molecularly oriented ethylene terephthalate polymer and an unoriented amorphous ethylene terephthalate polymer binder having a melting point in the amorphous state lower than the melting point in the crystalline state, hot-pressing the mixture at a temperature of at least the melting point of the binder in the amorphous state, maintaining the said mixture at least at this temperature until the binder at least partially resolidifies by crystallization and thereafter resolidifying any remaining liquid binder; the said ethylene terephthalate polymer of both the fiber and binder being polyethylene terephthalate.

References Cited in the file of this patent

UNITED STATES PATENTS

| 2,465,319 | Whinfield et al. | Mar. 22, 1949 |
| 2,618,020 | Busse et al. | Nov. 18, 1952 |

FOREIGN PATENTS

| 610,170 | Great Britain | Oct. 12, 1948 |

OTHER REFERENCES

"Concise Chemical and Technical Dictionary" (1947), Chemical Publishing Co., Inc., page 26 relied on.